United States Patent [19]

Ziaylek, Jr.

[11] 4,003,287

[45] Jan. 18, 1977

[54] INSERT OF THE SELF-TAPPING FLUTED TYPE

[75] Inventor: Theodore Ziaylek, Jr., Yardley, Pa.

[73] Assignee: Yardley Products Corporation, Yardley, Pa.

[22] Filed: July 8, 1975

[21] Appl. No.: 594,160

[52] U.S. Cl. .................................. 85/47; 151/41.73

[51] Int. Cl.[2] .................................. F16B 25/00

[58] Field of Search ........................ 85/16, 320, 47; 151/41.73

[56] References Cited

UNITED STATES PATENTS

| | | | |
|---|---|---|---|
| 2,293,930 | 8/1942 | Braendel | 85/47 |
| 2,823,574 | 2/1958 | Rosan | 85/47 |
| 3,183,531 | 5/1965 | McKewan | 85/47 X |
| 3,233,500 | 2/1966 | DeVellier | 85/47 X |
| 3,244,055 | 4/1966 | Schuermann et al. | 85/47 |
| 3,362,281 | 1/1968 | Finlay | 85/47 |
| 3,405,596 | 10/1968 | Neuschotz | 85/47 |
| 3,451,080 | 6/1969 | McIntyre et al. | 85/47 X |
| 3,492,908 | 2/1970 | Thurston | 85/47 |
| 3,866,509 | 2/1975 | Kraus et al. | 85/47 X |
| 3,866,510 | 2/1975 | Eibes et al. | 85/47 |

FOREIGN PATENTS OR APPLICATIONS

| | | | |
|---|---|---|---|
| 774,860 | 1/1968 | Canada | 85/47 |
| 439,636 | 9/1948 | Italy | 85/47 |
| 843,129 | 8/1960 | United Kingdom | 85/47 |

*Primary Examiner*—Roy D. Frazier
*Assistant Examiner*—Thomas J. Holko
*Attorney, Agent, or Firm*—Sperry and Zoda

[57] ABSTRACT

A metallic fastener or insert of the type adapted to thread itself into a recess formed in a plastic work piece has a multiplicity of uniformly angularly spaced, longitudinally extending flutes, each of which is formed with a flat bottom surface and with flat side walls angularly related to define between them an included angle of about 60°. The flutes are each formed to a depth greater than the root diameter of the external threads of the insert, that is, the flat bottom surface of each flute lies in a plane tangential to an imaginary circle of a diameter smaller than the root diameter of the external thread of the insert.

In accordance with the invention, the opposite end portions of the insert are tapered frustro-conically. The external diameter of the insert at each of its tapered ends is smaller than the diameter of the mentioned imaginary circle, such that the opposite ends of each flute merge into the tapered end portions of the insert short of the extremities of the insert and there disappear.

When threaded into a recess having a diameter equal to or smaller than the diameter of the insert at the end of the flute, the insert will set up a cutting action, adapted to cause chips to be directed into and confined wholly within each flute, in such a way as to ultimately fill up each flute and compress the chips therein so compactly as to cause the compressed chips to become to all intents and purposes integral once again with the surrounding plastic material, whereby to securely lock the insert against reverse rotation out of the work piece recess.

6 Claims, 10 Drawing Figures

MD
22
20
22
18
10
W
16
RD
27
C
14
R
18
D
20
12
10

Fig. 1
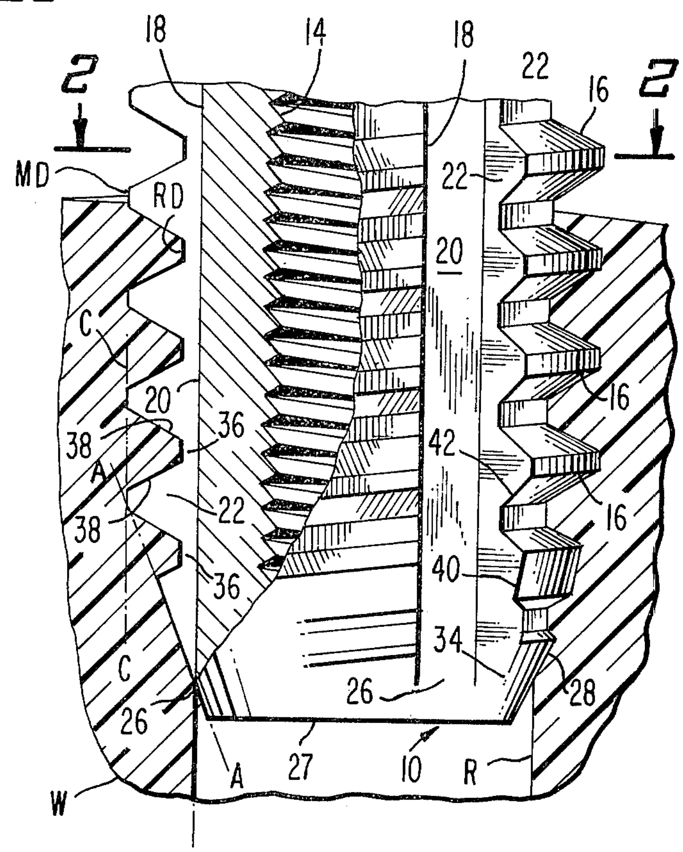
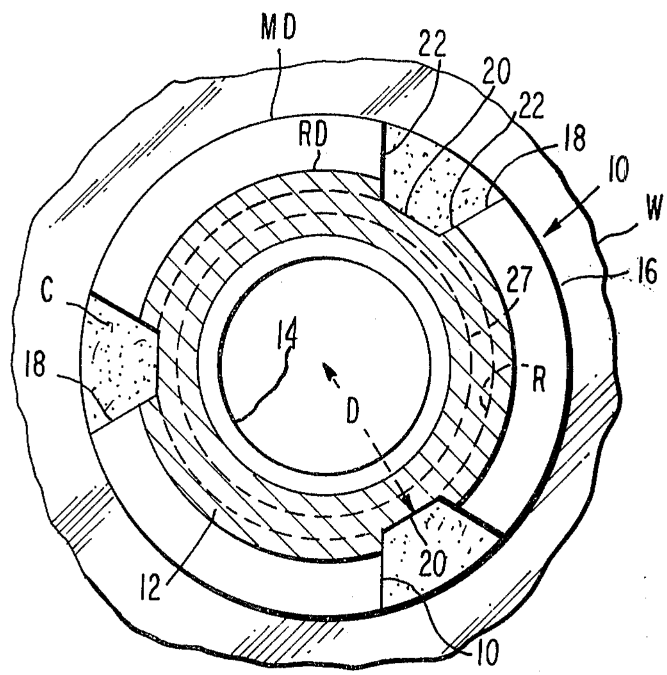
Fig. 2

INSERT OF THE SELF-TAPPING FLUTED TYPE

BACKGROUND OF THE INVENTION

1. Field of the Invention

Metal inserts are frequently embedded in any of various plastic materials, to afford means for receiving mating fastener elements. To this end, a cylindrical insert is conventionally provided, having a threaded bore, such that when the insert is embedded in a recess formed in the surface of a plastic work piece, it will in this way provide a hole or recess having metallic, internal threads, adapted to receive complementary threads formed upon a mating fastener element.

The invention thus may appropriately be said to fall within the field of fasteners generally, and more specifically in that area of this general field relating to the provision of metallic fasteners fixedly embedded in the surfaces of plastic work pieces.

2. Description of the Prior Art

Metallic inserts of the type described above are well known in and of themselves, and in many instances have external threads for the specific purpose of allowing the insert to thread itself into the initially smooth-walled recess of a plastic work piece. Thus, self-tapping inserts are not new in and of themselves. Nor is it new to provide, in an insert of this type, uniformly, angularly spaced flutes. Further, it is also known to taper the ends of an insert of this type.

The prior art, however, has not up until now provided a fully satisfactory solution to the problems encountered in the provision and mounting of threaded inserts of this general type. In the prior art, for example, the flutes are designed to receive chips resulting from the cutting action of the insert threads as the insert taps the hole of the plastic work piece.

Although the prior art inserts, through the formation of the flutes at angularly spaced locations on their circumferences, have to some degree provided an accommodation for the chips from the work piece, it has been found that the chip-receiving function of said inserts has been heretofore discharged with comparative inefficiency. The reason is that there has been no specially, scientifically planned relationship between the flute depths, the cross-sectional shapes of the flutes, the tapered ends of the insert, and the relationship of the flute bottom surfaces to the roots of the threads, that are intended to and do successfully cause the chips to produce a true self-locking action when the insert is fully engaged in the work piece.

SUMMARY OF THE INVENTION

As hereinbefore noted, it is old to provide tapered, externally threaded self-tapping inserts formed with angularly spaced, longitudinal flutes.

In accordance with the present invention, this already known, basic insert construction is formed in such a way as to provide a specific relationship and shape to the various basic components of a flute of this type. Briefly, the invention incorporates the concept of merging the ends of each flute into the frustro-conically tapered portions of the insert, at locations short of the extremities of the insert, and in combination with this feature the insert is so formed that the flutes thereof have flat bottom surfaces and flat side surfaces, with the side surfaces angularly related at approximately 60° to each other.

The construction is such that when the insert is threaded into a hole the diameter of which is no greater than that of the tapered insert portion where the flutes end, all chips cut from the plastic material, as the insert threads itself into it, are confined within the flutes. The construction, further, causes said chips to be ultimately compressed into a cohesive, solid mass within each flute, such as to make said mass integral, to all intents and purposes, with the surrounding, uncut, work piece material. This is accomplished through the provision of the features already described above, taken further with the concept of forming the flutes to a depth greater than the root diameter of the external threads of the device.

BRIEF DESCRIPTION OF THE DRAWING

FIG. 1 is a fragmentary view, partly in section and partly in elevation, of an insert and work piece, showing the insert partially threaded into the work piece;

FIG. 2 is a transverse sectional view through the insert, substantially on line 2—2 of FIG. 1;

DESCRIPTION OF THE PREFERRED EMBODIMENT

Figure 3:
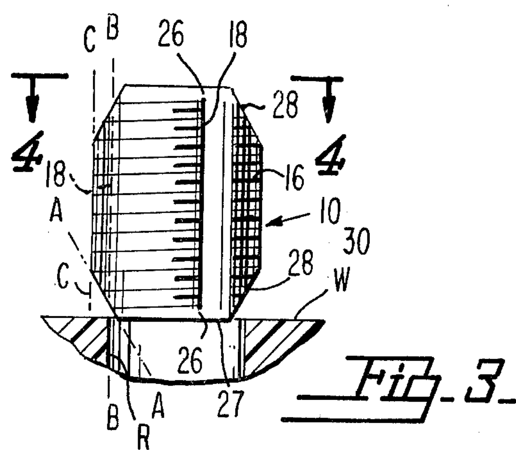
FIG. 3 is a view showing the work piece fragmentarily and in section, with an insert according to the invention about to enter the recess.

The insert 10 constituting the present invention has been illustrated in association with a plastic work piece W having a cylindrical recess R extending inwardly from the surface thereof, to receive the insert.

Insert 10 is of metal material, in a preferred embodiment, and comprises a cylindrical, elongated body 12, formed with a threaded, axial bore 14 adapted to receive mating threads of a complementary fastener element, not shown.

It is believed sufficiently obvious as not to require special illustration that instead of having an internally threaded bore, the insert can be of the male variety having an externally threaded extension of reduced diameter with respect to the main diameter of the insert body, which extension would project outwardly from the surface of the work piece when the insert is fully engaged therein. The present invention, thus, is not concerned with the means for accommodating complementary fastener elements, and these can be of either the male or female type, whichever is desired. The present invention is concerned, instead, with the means incorporated in the insert for engaging the insert in the recess R of work piece W.

To this end, the insert is formed with external threads 16, which can be of various types, pitches, and thread sizes, according to the needs or desires of the user. In the illustrated example, the device is shown with American (National) Standard threads but this is only by way of illustration and is not critical to successful operation of the invention.

It may also be observed that in the illustrated example, the threads 16 of the insert are somewhat exaggerated in size, in order to more clearly illustrate the inventive concept, and in a commercial embodiment would very likely be of a smaller major diameter in respect to the diameter R of the recess of the work piece.

In the illustrated embodiment, there are three flutes, uniformly angularly spaced about the circumference of the insert. The flutes have been designated 18, and each flute is formed with a flat bottom surface 20, and with flat side surfaces 22 defining an included angle of 60° between them. Referring to FIG. 1, the flutes extend longitudinally of the insert, with each flute having its end 26 disposed short of the adjacent extremity 27 of the insert body.

The opposite end portions of the insert body are frustro-conically formed, and have been designated 28 in the several figures of the drawing. Each end portion 28 is so tapered that a plane A—A tangential thereto, and coincident to the angle of taper of the end portion, intersects the plane B—B of each bottom surface 20 of a flute 18, intermediate the extremity 26 of the insert and a plane C—C tangential to the diameter of the intermediate portion 30 of the insert. As a result, each flute merges into the frustro-conical end portions 28 at short distances inwardly from the adjacent extremities 27 of the insert body.

It is also significant that, as shown to particular advantage in FIG. 2, the root diameter of the external threads 16 is more then twice the radial distance D taken from the center of the insert to any of the bottom surfaces 20 of the flutes. Or, stated otherwise, the depth of each flute is greater than the depth of the threads 16.

Each flute, as will be noted from FIG. 1, has its flat bottom surface 20 parallel to the axis of the insert, and parallel also to a plane C—C tangential to the major diameter MD of the external threads 16.

In use of the insert comprising the present invention, as is customary a recess R is first formed in the work piece W. The recess may be formed by molding, or may alternatively be drilled in the work piece after completion thereof. In any event, the insert would be threaded into recess R through the provision of any suitable driving tool, not shown, well known in the trade.

The diameter of the recess R of the work piece, when the insert of the present invention is used, is selected to be greater than the diameter of the extremity 27 of the insert, equal to or smaller than the diameter of the hereinbefore mentioned imaginary circle to which the bottom surfaces 20 are tangent, and smaller than the major diameter MD of threads 16, taken anywhere along the length of the intermediate portion 30 of the insert 30.

Figure 5:
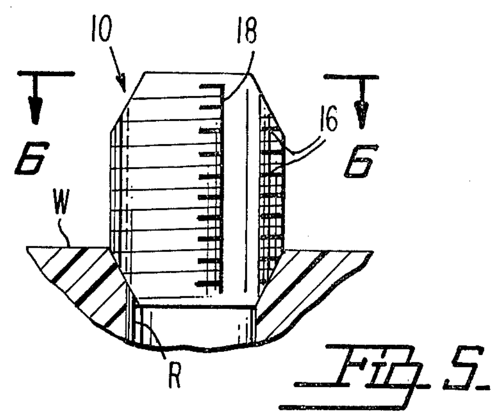
FIG. 5 is a view like FIG. 3 in which the insert has entered the recess.
Figure 4:
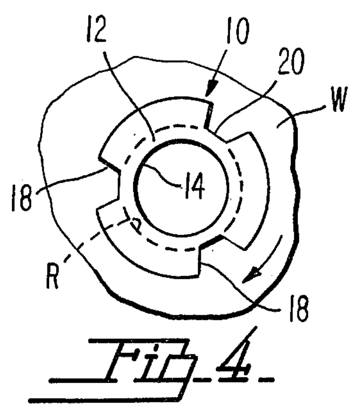
FIG. 4 is a view of the insert and work piece as seen from the line 4—4 of FIG. 3.
Figure 6:
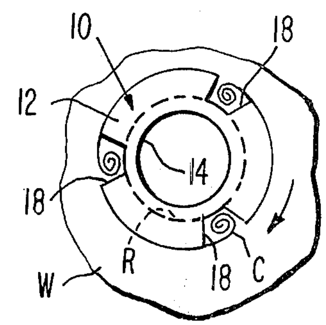
FIG. 6 is a view of the insert as seen from line 6—6 of FIG. 5.

As the insert threads itself into the recess R, the reduced-diameter extremity 27 thereof provides a lead for centering the insert within the recess. Continued axial and rotational movement of the insert from the FIG. 3 position to the FIG. 5 position causes the trailing edge 34 of the flute adjacent end 26 thereof (see FIG. 1) to cut the wall of the recess R away, starting a spirally formed chip C (see FIG. 6).

Since the radial distance D between the surface 20 of each flute and the center or axis of the insert is equal to or greater than the radius of recess R (it is equal to said radius in the example), the chips C cannot escape from the flutes into recess R, that is, said chips cannot fall into the bottom of the recess, being instead trapped within the flutes. Said chips are accordingly forced axially of the insert as the insert continues to thread its way into the recess, now passing through restricted area 36 defined between the bottom surface 20 of the flute and root diameter RD of threads 16. These restricted areas occur between adjacent cavities 38 defined within the flutes by the crests of the threads.

As a result, continued threading of the insert into the recess produces more and more chips, as successive edges 40, 42 (see FIG. 1) present themselves to the wall of the recess and cut away the wall.

The chip material removed from the wall of the recess to accommodate the threads of the self-tapping insert is all trapped within the flutes, as previously mentioned, due to the fact that the leading ends of the flutes are closed due to the relationship of the radius of recess R to the radial distance D, selected as noted above to be such as to be equal to or smaller than said radial distance.

Figure 7:
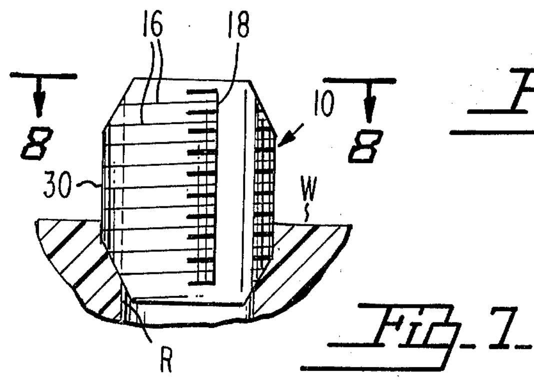
FIG. 7 is a view similar to FIG. 3 in which the insert has threaded itself still further into the recess.
Figure 9:
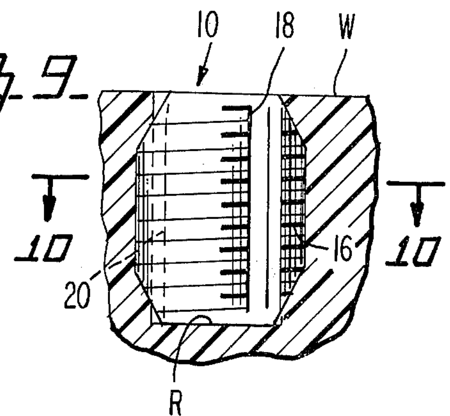
FIG. 9 is a view like FIG. 3 in which the insert has been threaded into the recess to its full extent.
Figure 8:
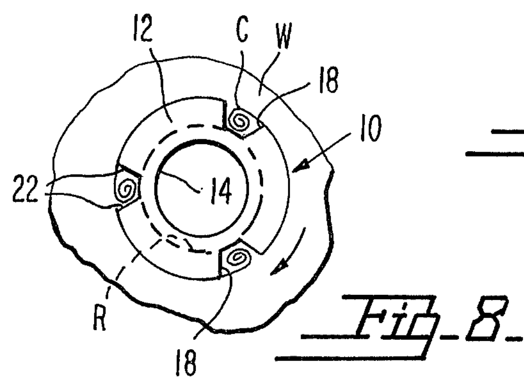
FIG. 8 is a view of the insert as seen from line 8—8 of FIG. 7.

Continued threading of the insert into the recess ultimately brings the intermediate portion 30 thereof (see FIG. 7) into the recess, producing additional cutting of material away from the wall of the recess as the threads enter. In this connection, it has been found in actual practice that the particular angular shape of each flute, viewing the same in cross-section, is extremely desirable to start the material cut away from the work piece curving in a spiral, in such fashion as to better compact the displaced material. The result is that said displacement material is subjected to a compacting pressure, such as to form, ultimately, a very dense, highly compacted mass within each flute, the density of which reaches its maximum when the insert is threaded fully into the recess as shown in FIG. 9. Throughout the threading action, the restricted areas 36 act as relief valves, so to speak, permitting the chips to flow through the entire length of the flute until ultimately, said chips fill the flute fully to the trailing end thereof.

Figure 10:
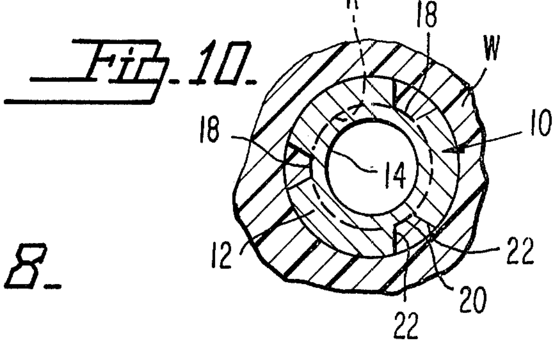
FIG. 10 is a view taken through the insert and work piece, substantially on line 10—10 of FIG. 9.

This flow of the chip material, however, is not so free as to prevent compaction and pressurizing of said material within the flute. At their trailing ends the flutes are substantially closed, and of course as already noted they are fully closed at their leading ends, so that by selective relation of the cross-sectional dimensions of each flute to the recess diameter and the thread size, one can predetermine the amount of chip material that will be trapped in the several flutes. This allows predetermination of the extent of compaction or pressurizing of said material trapped within the flutes in the manner described above. The final result is that when the insert is fully threaded into the recess, the compacted material, shown in FIG. 10, is of a density matching or close to the density of the work piece proper surrounding the recess, whereby the chip material thus becomes, to all intents and purposes, one with the surrounding material. This provides a highly effective locking action, designed to firmly embed the insert in the recess R, to prevent rotational movement of the insert in either direction after it has been fully extended into the recess. This is, of course, of great importance, since the insert is thereafter to serve as one component of a threaded fastener, and would lose its ability to discharge this function were it to be subject to rotational movement within the recess.

It is to be understood that the particular overall length of the insert, the length of the intermediate portion in relation to the lengths of the frusto-conical end portions, the thread size, and the number of flutes, can be varied as desired according to the particular application, but in every instance the characteristic is inherent in the invention, of trapping the chips cut away by the self-tapping insert, in the flutes, to an extent such as to compact said chips and place them under heavy pressure, until the density thereof causes the chips to become integral to all intents and purposes with the surrounding material, hence to provide an effective locking action not heretofore achieved.

I claim:

1. A fastener element or insert of the self-tapping type intended for engagement in a recess of a plastic article and having means for mating with a complementary fastener element, comprising; a cylindrical body formed with external threads and with a series of flutes angularly spaced about the circumference of the body, said body having tapered end portions and said flutes merging into said end portions short of the extremities of the body, the relationship of said flutes and threads in the sense of the dimensions thereof being selected such that upon threading of the full length of the insert into a recess the radius of which is less than the radial distance measured between the axis of the body and the point of greatest depth of a flute, chips removed by the insert threads will be trapped and compacted in the flutes to a density substantially duplicative of the density of undisturbed material contiguous to the compacted chips thereby to lock the insert in the recess.

2. A fastener element or insert as in claim 1 wherein said body has an intermediate portion of constant diameter over the full length thereof, and is formed with frustro-conical end portions tapering in a direction away from said intermediate portion, said intermediate portion being formed with external threads and said threads continuing for part of the lengths of the end portions, the root diameter of said threads being greater than the smaller ends of said end portions but less than the diameter of the larger ends of said end portions, said flutes having bottom surfaces disposed a radial distance away from the axis of the body less than the distance the thread roots are spaced from said axis and also less than the radial dimension of the larger ends of said end portions of the body, said radial distance between the axis of the body and the bottom surfaces of the flutes being greater than the radial dimension of the smaller ends of said end portions.

3. A fastener element or insert as in claim 2, wherein there are flats at the roots of the threads, cooperating with the bottom surfaces of the flutes to define restricted areas through which chips trapped in the flutes may pass.

4. A fastener element or insert as in claim 3, wherein the crests of threads define, at opposite sides of each restricted area, cavities within which the trapped chips are compacted during threading of the insert into the recess of the work piece.

5. An insert of the type adapted to thread itself into and become embedded in a pre-formed recess of a workpiece, to provide therein a fastener element adapted for connecting a complementary fastener element to the workpiece, said insert comprising: a cylindrical body having a constant-diameter portion merging at least at one end thereof into a frustro-conical end portion, said end portion tapering to an extremity of the body adapted for extension into an insert-receiving, pre-formed workpiece recess of a diameter greater than that of said extremity but less than that of the constant-diameter body portion, thus to provide a lead for centering the insert in the recess; means on the body adapted for mating engagement with a complementary fastener element intended for connection to said workpiece; an external, continuous thread on said body extending the full length of said constant-diameter portion and continuing into the end portion of the body, said thread terminating between the respective ends of the end portion; and a series of flutes angularly, uniformly spaced about the circumference of said body, each of said flutes extending continuously the full length of said constant-diameter portion and continuing into the end portion to terminate between said ends of the end portion, the bottom surface of each flute lying in a plane parallel to the axis of the body over the full length of the flute, the taper of said end portion being selected such that a plane tangential to the end portion and coincident with the angle of taper thereof will intersect the plane of the bottom surface of each flute intermediate said extremity of the body and a plane tangential to the diameter of said constant-diameter portion of the body, each flute merging into said end portion in closely spaced relation to said extremity of the body, the root diameter of the thread being spaced a greater radial distance from the axis of the body than the radial distance said bottom surfaces of the flutes are spaced therefrom, said flutes being of a cross-sectional area and length sufficient to provide spaces for receiving material displaced from the wall of the recess of the workpiece whenever the insert is threaded into a recess the diameter of which is greater than that of said extremity but is not greater than twice the radial distance that the bottom surface of each flute is spaced from said axis of the insert, whereby each flute is closed at the end thereof that is leading in the sense of the direction of axial movement of the body into the recess, the cross-sectional dimension of each flute being selected in relation to the size of said thread such that the material displaced from the recess wall by the thread is compacted within the flutes to a high density that substantially matches that of the uncut material of the workpiece proper contiguous to the compacted material following threading of the full length of the insert into the recess.

6. An insert as in claim 5 wherein each flute has a flat bottom surface and flat side surfaces that are symmetrically related to the flat bottom surface thereof and are divergent, when viewed in cross section, in a direction away from said axis of the insert body.

* * * * *